US008038068B2

(12) United States Patent
Yuzon et al.

(10) Patent No.: US 8,038,068 B2
(45) Date of Patent: Oct. 18, 2011

(54) MULTIFUNCTION REMOVABLE COVER FOR PORTABLE PAYMENT DEVICE

(75) Inventors: Ryan Yuzon, San Francisco, CA (US); Ayman Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 987 days.

(21) Appl. No.: 11/998,168

(22) Filed: Nov. 28, 2007

(65) Prior Publication Data

US 2009/0134218 A1 May 28, 2009

(51) Int. Cl.
*G06K 19/06* (2006.01)

(52) U.S. Cl. ........................................ 235/492; 235/380

(58) Field of Classification Search .................. 235/492, 235/375, 380, 382, 382.5, 475, 486, 487, 235/493

See application file for complete search history.

(56) References Cited

U.S. PATENT DOCUMENTS

| | | | | |
|---|---|---|---|---|
| 4,480,250 | A * | 10/1984 | McNeely | 340/568.7 |
| 5,051,724 | A * | 9/1991 | Morrow et al. | 340/568.1 |
| 5,090,563 | A | 2/1992 | Becker | |
| 5,275,285 | A * | 1/1994 | Clegg | 206/449 |
| 5,288,942 | A | 2/1994 | Godfrey | |
| 5,335,366 | A | 8/1994 | Daniels | |
| 5,465,206 | A | 11/1995 | Hilt et al. | |
| 5,477,038 | A | 12/1995 | Levine et al. | |
| 5,500,513 | A | 3/1996 | Langhans et al. | |
| 5,515,031 | A * | 5/1996 | Pereira et al. | 340/693.3 |
| 5,594,200 | A | 1/1997 | Ramsey | |
| 5,621,201 | A | 4/1997 | Langhans et al. | |
| 5,941,375 | A | 8/1999 | Kamens et al. | |
| 6,079,621 | A | 6/2000 | Vardanyan et al. | |
| 6,121,544 | A | 9/2000 | Petsinger | |
| 6,127,938 | A | 10/2000 | Friedman | |
| 6,247,129 | B1 | 6/2001 | Keathley et al. | |
| 6,359,216 | B1 | 3/2002 | Liu | |
| 6,375,780 | B1 | 4/2002 | Tuttle et al. | |
| 6,400,270 | B1 | 6/2002 | Person | |
| 6,457,647 | B1 * | 10/2002 | Kurihashi et al. | 235/486 |
| 6,502,135 | B1 | 12/2002 | Munger et al. | |
| 6,560,581 | B1 | 5/2003 | Fox et al. | |
| 6,588,660 | B1 | 7/2003 | Buescher et al. | |
| 6,646,554 | B1 | 11/2003 | Goff et al. | |
| 6,759,736 | B2 | 7/2004 | Bohmer et al. | |
| 6,785,519 | B2 | 8/2004 | Toyoda et al. | |
| 6,826,616 | B2 | 11/2004 | Larson et al. | |
| 6,837,425 | B2 | 1/2005 | Gauthier et al. | |
| 6,845,863 | B1 | 1/2005 | Riley | |

(Continued)

FOREIGN PATENT DOCUMENTS

DE 9015824 U1 2/1991

(Continued)

OTHER PUBLICATIONS

European Search Report issued Mar. 10, 2010 in EP 08020393.

(Continued)

*Primary Examiner* — Thien M Le

(74) *Attorney, Agent, or Firm* — Kilpatrick Townsend & Stockton LLP

(57) ABSTRACT

Methods and devices for conducting financial transactions are provided. Aspects and embodiments include multifunction removable covers for portable payment devices; multifunction removable covers configured as password token type portable payment devices; and multifunction removable covers configured as radio frequency shields to prevent unintended data transmission.

19 Claims, 12 Drawing Sheets

U.S. PATENT DOCUMENTS

| | | | |
|---|---|---|---|
| 6,859,831 | B1 | 2/2005 | Gelvin et al. |
| 6,920,611 | B1 | 7/2005 | Spaeth et al. |
| 6,970,070 | B2 | 11/2005 | Juels et al. |
| 7,007,840 | B2 | 3/2006 | Davis |
| 7,039,611 | B2 | 5/2006 | Devine |
| 7,051,923 | B2 | 5/2006 | Nguyen et al. |
| 7,081,865 | B2 | 7/2006 | Wu et al. |
| 7,086,587 | B2 | 8/2006 | Myllymaki |
| 7,104,446 | B2 | 9/2006 | Bortolin et al. |
| 7,121,456 | B2 | 10/2006 | Spaeth et al. |
| 7,124,937 | B2 | 10/2006 | Myers et al. |
| 7,152,780 | B2 | 12/2006 | Gauthier et al. |
| 7,187,959 | B2 | 3/2007 | Ponce De Leon et al. |
| 7,243,840 | B2 | 7/2007 | Bason et al. |
| 7,243,853 | B1 | 7/2007 | Levy et al. |
| 7,280,981 | B2 | 10/2007 | Huang et al. |
| 7,482,925 | B2 | 1/2009 | Hammad et al. |
| 7,571,752 | B1 * | 8/2009 | Donohoe ...................... 150/134 |
| 7,635,089 | B2 | 12/2009 | Augustinowicz et al. |
| 7,659,606 | B2 * | 2/2010 | Klatt ............................ 257/679 |
| 7,701,408 | B2 | 4/2010 | Bombay et al. |
| 7,784,684 | B2 | 8/2010 | Labrou et al. |
| 2002/0031997 | A1 | 3/2002 | Lawler, Jr. et al. |
| 2002/0046351 | A1 | 4/2002 | Takemori et al. |
| 2002/0137473 | A1 | 9/2002 | Jenkins |
| 2002/0158747 | A1 | 10/2002 | McGregor et al. |
| 2003/0119459 | A1 | 6/2003 | Carillo et al. |
| 2003/0233292 | A1 | 12/2003 | Richey et al. |
| 2004/0019522 | A1 | 1/2004 | Bortolin et al. |
| 2004/0044621 | A1 | 3/2004 | Huang et al. |
| 2004/0050922 | A1 | 3/2004 | Gauthier et al. |
| 2004/0054581 | A1 | 3/2004 | Redford et al. |
| 2004/0054590 | A1 | 3/2004 | Redford et al. |
| 2004/0054591 | A1 | 3/2004 | Spaeth et al. |
| 2004/0117514 | A1 | 6/2004 | Nelms et al. |
| 2004/0139021 | A1 | 7/2004 | Reed et al. |
| 2004/0140896 | A1 | 7/2004 | Ohkawa et al. |
| 2004/0148224 | A1 | 7/2004 | Gauthier et al. |
| 2004/0153715 | A1 | 8/2004 | Spaeth et al. |
| 2004/0220964 | A1 | 11/2004 | Shiftan et al. |
| 2005/0021456 | A1 | 1/2005 | Steele et al. |
| 2005/0029344 | A1 | 2/2005 | Davis |
| 2005/0036611 | A1 | 2/2005 | Seaton et al. |
| 2005/0045718 | A1 | 3/2005 | Bortolin et al. |
| 2005/0050367 | A1 | 3/2005 | Burger et al. |
| 2005/0058427 | A1 | 3/2005 | Nguyen et al. |
| 2005/0071225 | A1 | 3/2005 | Bortolin et al. |
| 2005/0071226 | A1 | 3/2005 | Nguyen et al. |
| 2005/0071227 | A1 | 3/2005 | Hammad et al. |
| 2005/0071228 | A1 | 3/2005 | Bortolin et al. |
| 2005/0071235 | A1 | 3/2005 | Nguyen et al. |
| 2005/0102234 | A1 | 5/2005 | Devine |
| 2005/0121506 | A1 | 6/2005 | Gauthier et al. |
| 2005/0149455 | A1 | 7/2005 | Bruesewitz et al. |
| 2005/0231921 | A1 * | 10/2005 | Noda et al. .................... 361/737 |
| 2005/0283416 | A1 | 12/2005 | Reid et al. |
| 2005/0283430 | A1 | 12/2005 | Reid et al. |
| 2005/0283431 | A1 | 12/2005 | Reid et al. |
| 2005/0283432 | A1 | 12/2005 | Reid et al. |
| 2005/0283433 | A1 | 12/2005 | Reid et al. |
| 2006/0017570 | A1 | 1/2006 | Moskowitz et al. |
| 2006/0044206 | A1 | 3/2006 | Moskowitz et al. |
| 2006/0080243 | A1 | 4/2006 | Kemper et al. |
| 2006/0124748 | A1 | 6/2006 | Osborn et al. |
| 2006/0155644 | A1 | 7/2006 | Reid et al. |
| 2006/0163345 | A1 | 7/2006 | Myers et al. |
| 2006/0178957 | A1 | 8/2006 | LeClaire |
| 2006/0179007 | A1 | 8/2006 | Davis |
| 2006/0187061 | A1 | 8/2006 | Colby |
| 2006/0208066 | A1 | 9/2006 | Finn et al. |
| 2006/0254815 | A1 | 11/2006 | Humphrey et al. |
| 2006/0290501 | A1 | 12/2006 | Hammad et al. |
| 2006/0293027 | A1 | 12/2006 | Hammad et al. |
| 2007/0001000 | A1 | 1/2007 | Nguyen et al. |
| 2007/0001001 | A1 | 1/2007 | Myers et al. |
| 2007/0005613 | A1 | 1/2007 | Singh et al. |
| 2007/0005774 | A1 | 1/2007 | Singh et al. |
| 2007/0012764 | A1 | 1/2007 | Bortolin et al. |
| 2007/0017970 | A1 | 1/2007 | Gauthier et al. |
| 2007/0034679 | A1 | 2/2007 | Gauthier et al. |
| 2007/0055597 | A1 | 3/2007 | Patel et al. |
| 2007/0055630 | A1 | 3/2007 | Gauthier et al. |
| 2007/0057034 | A1 | 3/2007 | Gauthier et al. |
| 2007/0057051 | A1 | 3/2007 | Bortolin et al. |
| 2007/0083465 | A1 | 4/2007 | Ciurea et al. |
| 2007/0100691 | A1 | 5/2007 | Patterson |
| 2007/0109130 | A1 | 5/2007 | Edenfield |
| 2007/0125842 | A1 | 6/2007 | Antoo et al. |
| 2008/0303632 | A1 | 12/2008 | Hammad |
| 2009/0069051 | A1 * | 3/2009 | Jain et al. ...................... 455/558 |
| 2009/0088229 | A1 | 4/2009 | Hammad et al. |
| 2009/0134218 | A1 | 5/2009 | Yuzon et al. |
| 2009/0134223 | A1 * | 5/2009 | Matthews et al. ............. 235/441 |
| 2009/0146814 | A1 | 6/2009 | Hammad et al. |
| 2010/0219099 | A1 * | 9/2010 | Schmitt et al. ................ 206/776 |

FOREIGN PATENT DOCUMENTS

| | | | |
|---|---|---|---|
| EP | 0822513 | A2 | 2/1998 |
| EP | 1313027 | A1 | 5/2003 |
| EP | 1503448 | A1 | 2/2005 |
| EP | 1542429 | A1 | 6/2005 |
| EP | 1764860 | A1 | 3/2007 |
| GB | 2238344 | A1 | 5/1991 |
| JP | 2002/092564 | A | 3/2002 |

OTHER PUBLICATIONS

International Preliminary Report on Patentability dated Dec. 23, 2009 from International Application No. PCT/US2008/065081, 5 pages.

European Official Communication Pursuant to Article 94(3) EPC for Application No. EP10184725.9, dated Oct. 8, 2010.

* cited by examiner

1000
Magstripe
Sig Panel
1002
Hologram
Bored Holes
1007
Side View
(Enlarged)
1007

1004
Display
Button
1006
battery
1020
Cardholder Name
Thermal Printing
1014
ATM Insertion
"Blocker"
1009
ATM Insertion
"Blocker"
1009
Side View
Joining "Pins" 1118
Back View

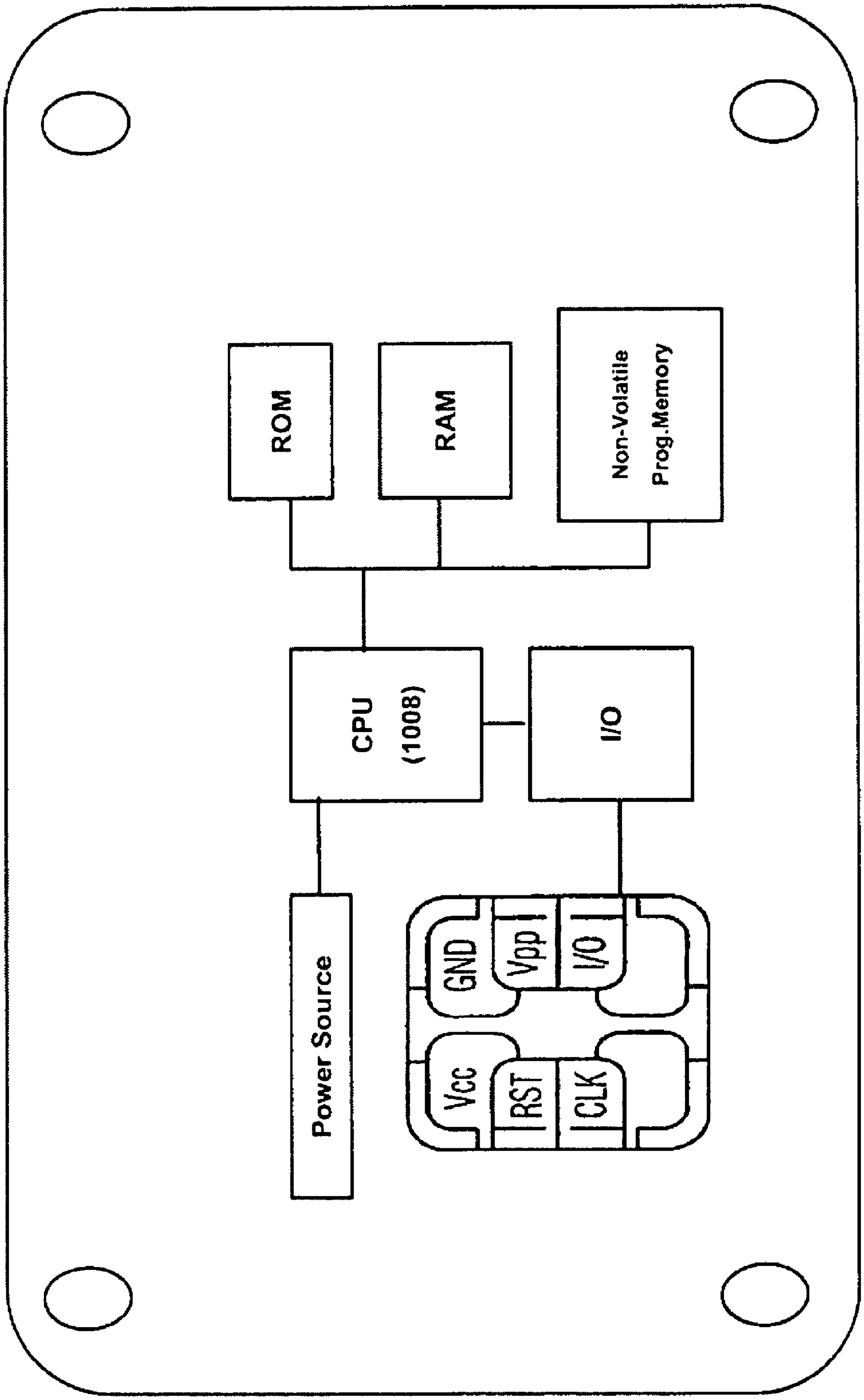
FIGURE 1D. Exposed view of an exemplary multifunction removable cover embodiment Assembly
Side View Assembly Back View
3001
Magstripe
Hologram
1018
Cardholder Name Magstripe
Sig Panel
1018
Hologram Cardholder Name
3003
USB
Connector
3000
ATM Insertion
"Blocker"

Assembly
Side View

Assembly Back View 4001

Shield
(e.g.aluminum)
4000

Magstripe
Sig Panel
Hologram
ATM Insertion
"Blocker"

Assembly
Side View

Assembly Back View
8001

Magnets
Aluminum
Shield
8000

Magstripe
Sig Panel
Hologram
Magnets
ATM Insertion
"Blocker"

MULTIFUNCTION REMOVABLE COVER FOR PORTABLE PAYMENT DEVICE

FIELD OF THE INVENTION

Aspects and embodiments of the present invention relate in general to methods and devices for conducting financial transactions. Certain aspects include multifunction removable covers for portable payment devices. Further aspects include multifunction removable covers configured as password token type portable payment devices. Further aspects include multifunction removable covers configured as radio frequency shields to prevent unintended data transmission.

BACKGROUND

The use of portable payment devices in financial transactions has seen a steady increase within the last few years. Currently, a variety of portable payment devices are commercially available. However, despite their initial popularity, one of the technical challenges which has limited the level of general acceptance of certain password token type portable payment devices is that several of these devices are dependent on a fixed internal power supply (e.g. battery) for sustained operations. This apparent limitation and the requirement for easy access to an internal power source renders some of these portable payment devices (e.g. credit cards) difficult to manufacture in a way that is in compliance with certain industry recognized manufacturing standards, such as, for example, International Standard Organization (ISO) standards; or in certain cases, the rigorous internal manufacturing standards of branded payment tokens.

Recently, the vulnerability of the static "user ID and password" during e-commerce and/or financial transactions has become increasingly apparent as identity theft and unauthorized access to private and confidential user data is increasingly prevalent. The traditional static "user ID and password" system is subject to security breach and/or password leakage during a variety of processes, including logon, password generation, storage and distribution. Current measures to enhance the security of the static "user ID and password" system include the use of one-time password systems that substitute the static password with a dynamic password. One-time passwords (OTPs), which may be generated randomly, automatically, and then displayed, typically can be used only once. They provide an additional level of security against breach of password security. However, certain technical challenges remain in delivering a one-time password in connection with the use of these password tokens as traditional one-time password systems are typically closed systems. Hence, the user may be inconvenienced with subscriptions to more than one service provider. Each service provider may also require a different token due to variations of individual service provider authentication servers. Further, some payment devices require a Personal Identification Number (PIN) to operate and the user must remember the PIN for each different device, which adds to the difficulty in implementation and possible reduced consumer usage.

Furthermore, if these initial hurdles are to be overcome and the usage of these portable payment devices become more prevalent, there is an additional need for the ability to prevent unintended radio frequency (RF) transmissions to protect user data when the RF-enabled password tokens are in transit while being delivered to the account holder or when the account holder is in an environment wherein the suspicion and/or the risk of security breach via unintended broadcast or signal capture is high.

Additionally, many account holders of portable payment devices are often unaware of the current account balance on their respective portable payment devices. While some issuer and acquirers mandate support for balance inquiries for some devices such as, for example, gift cards and incentive cards, such support is optional at merchants.

SUMMARY OF THE INVENTION

To address some of the problems and needs as stated in the forgoing, exemplary embodiments of the instant invention, including methods and devices for conducting financial transactions using multifunction removable card covers are provided.

In one aspect, multifunction removable covers for portable payment devices are provided. In certain embodiments, the multifunction removable cover comprises a solid support; and a card—communication contact, connected to the solid support, and configured to couple the multifunction removable cover to the portable payment device.

Other systems, methods, and/or products will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

Various aspects of the present invention will be readily understood by the following detailed description in conjunction with the accompanying drawings, wherein like reference numerals designate like elements in the several views. It is understood that the embodiments of the invention may have more or less components than are shown in the figures.

FIGS. 1A-1D illustrate exemplary multifunction removable cover embodiments for portable payment devices; the multi-function removable cover and corresponding payment device are shown separately (not coupled). The multifunction cover may further include a power source (e.g. battery), a display panel, a user input device (e.g. button), or an imprinting feature (cardholder name) shown in FIG. 1B. FIG. 1C is a back view of the cover and illustrates the respective placement of joining pins/pinhole features used in the coupling of the cover to the payment device. FIG. 1D illustrates the internal components (exposed view) of an exemplary multifunction card cover embodiment according to the invention.

In FIG. 3C, the I/O contact element, which is located on the surface of the multifunction cover proximal to the portable payment device, is shown in exposed view. The contact element on the multifunction cover is in communication with the contact element on the portable payment device.

4C, the cover and portable payment device are coupled. In FIGS. 4B-4D, the cover further comprises one or more insertion blockers.

In FIG. 5B-5C, the cover further comprises a display and user input device. In FIG. 5C, contact elements (shown in exposed view) on the multifunction cover is in communication with the contact element on the portable payment device.

DETAILED DESCRIPTION OF THE INVENTION

Figures 1A, 1B, 1C:
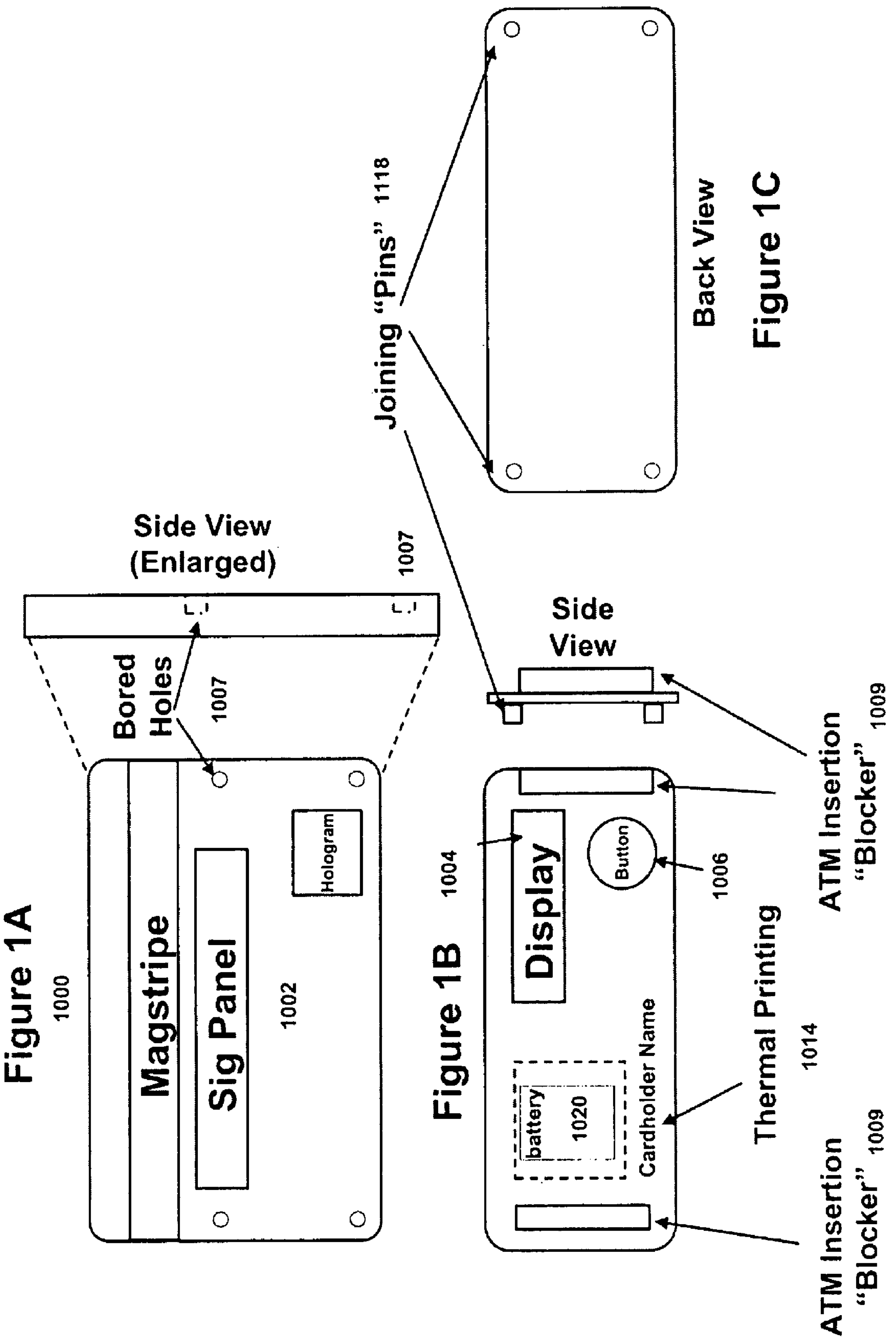
Figures 2A, 2B, 2C, 2D:
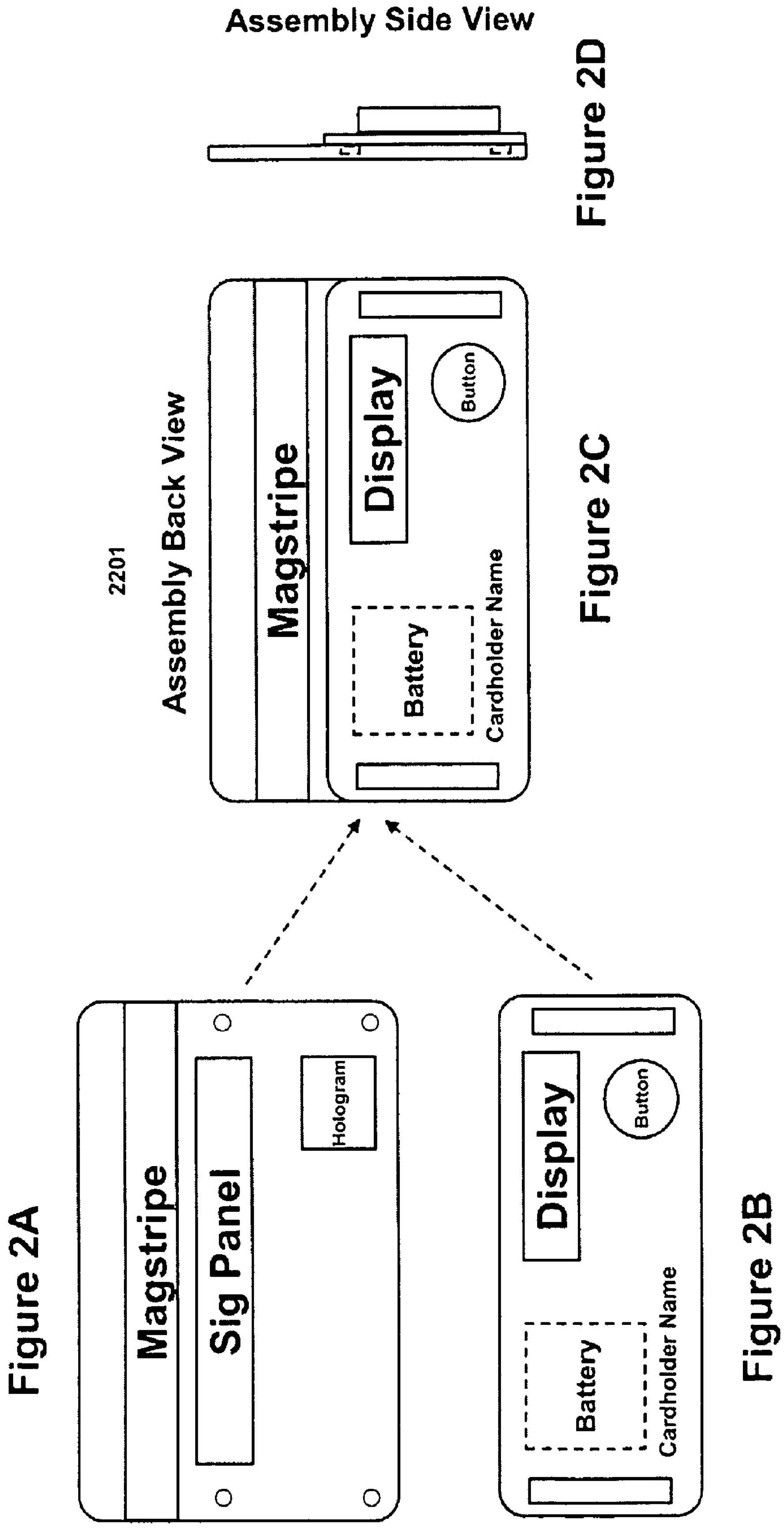
FIGS. 2A-2D illustrate an exemplary multifunction removable card cover embodiment wherein the card and the card cover are coupled and the pins and the corresponding pinholes are accordingly aligned (shown as card/card-cover coupled assembly in FIG. 2C).
Figures 3A, 3B, 3C, 3D:
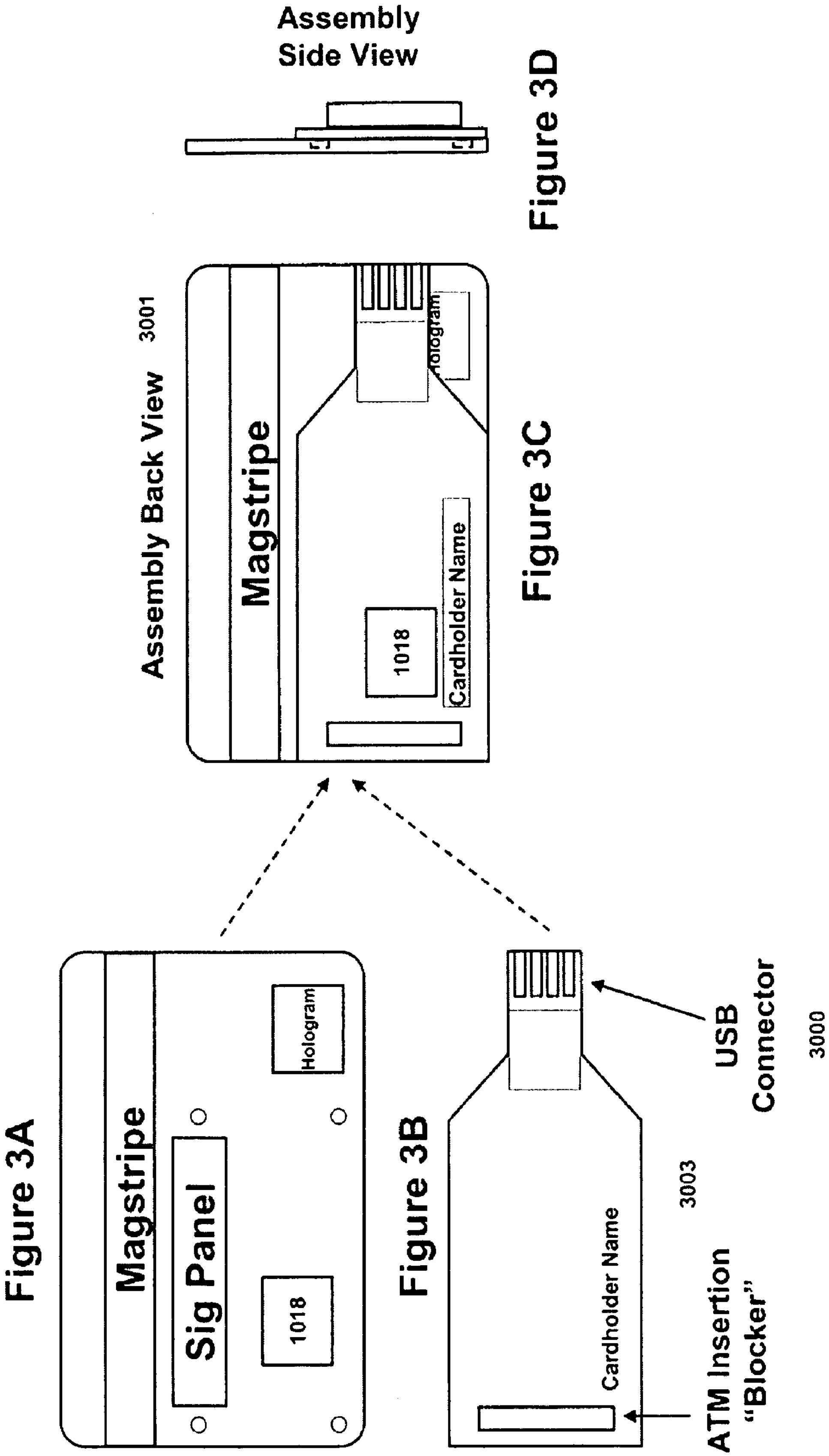
FIGS. 3A-3D illustrate another example of the multifunction removable card cover embodiment wherein the card cover additionally comprises an exemplary external interface (e.g. universal serial bus (USB) connector).
Figures 4A, 4B, 4C, 4D:
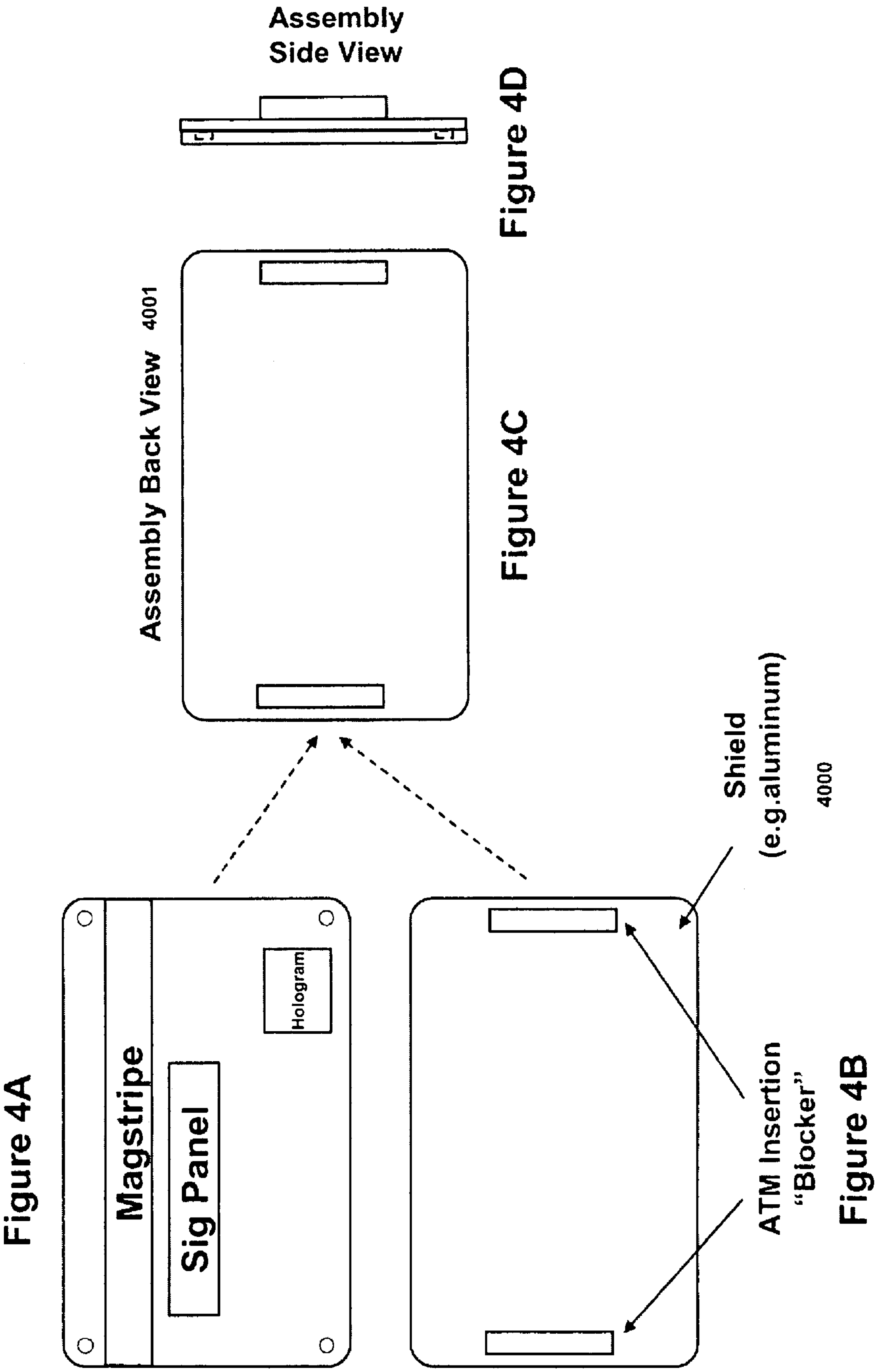
FIGS. 4A-4D illustrate another example of the multi-function removable card cover embodiment wherein the card cover is configured as a radio frequency (RF) shield. In FIG.
Figures 5A, 5B, 5C, 5D:
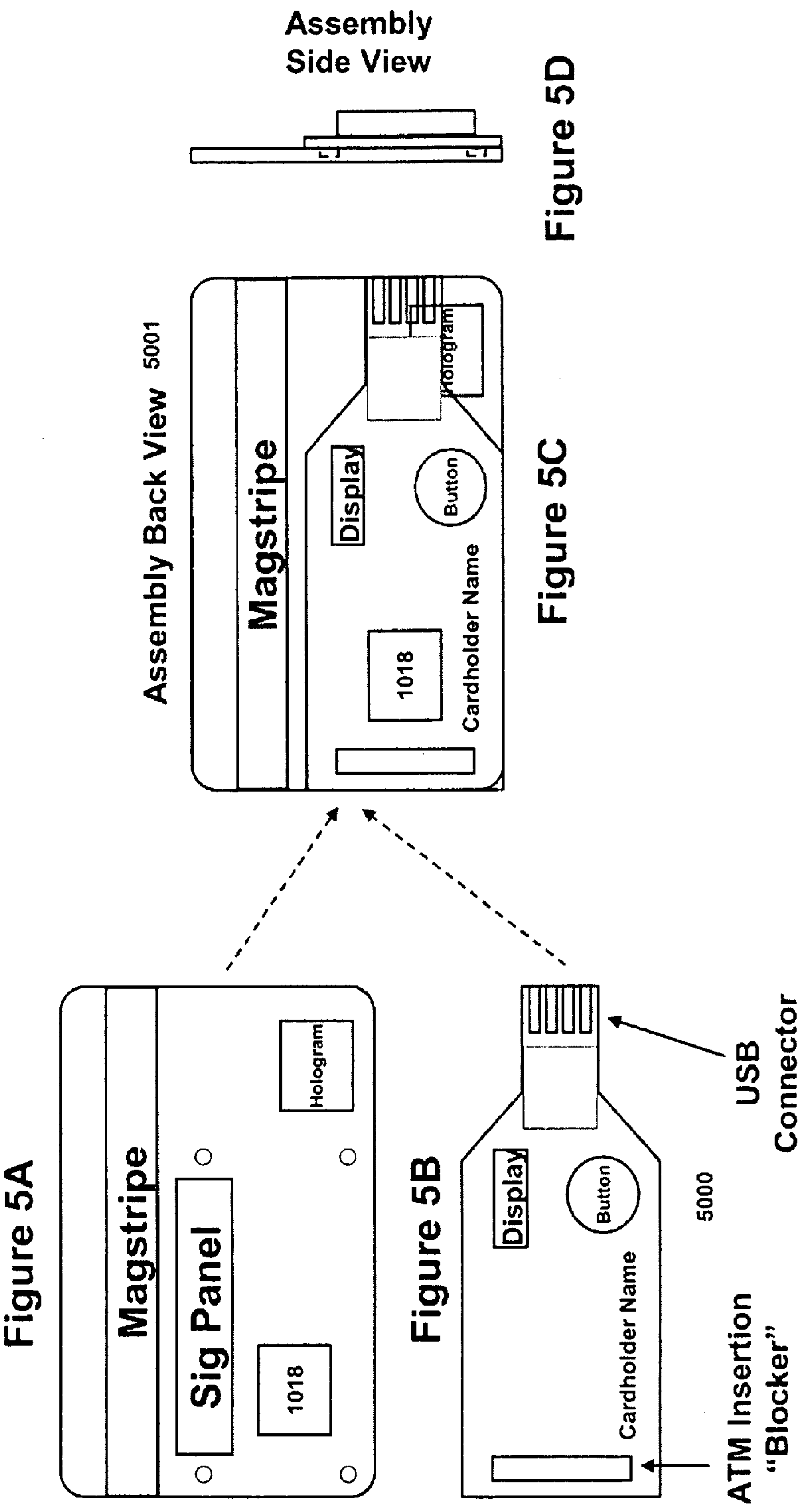
FIGS. 5A-5D illustrate another example of the multifunction removable card cover embodiment wherein the card cover comprises an external interface (e.g. USB connector).
Figures 6A, 6B, 6C, 6D:
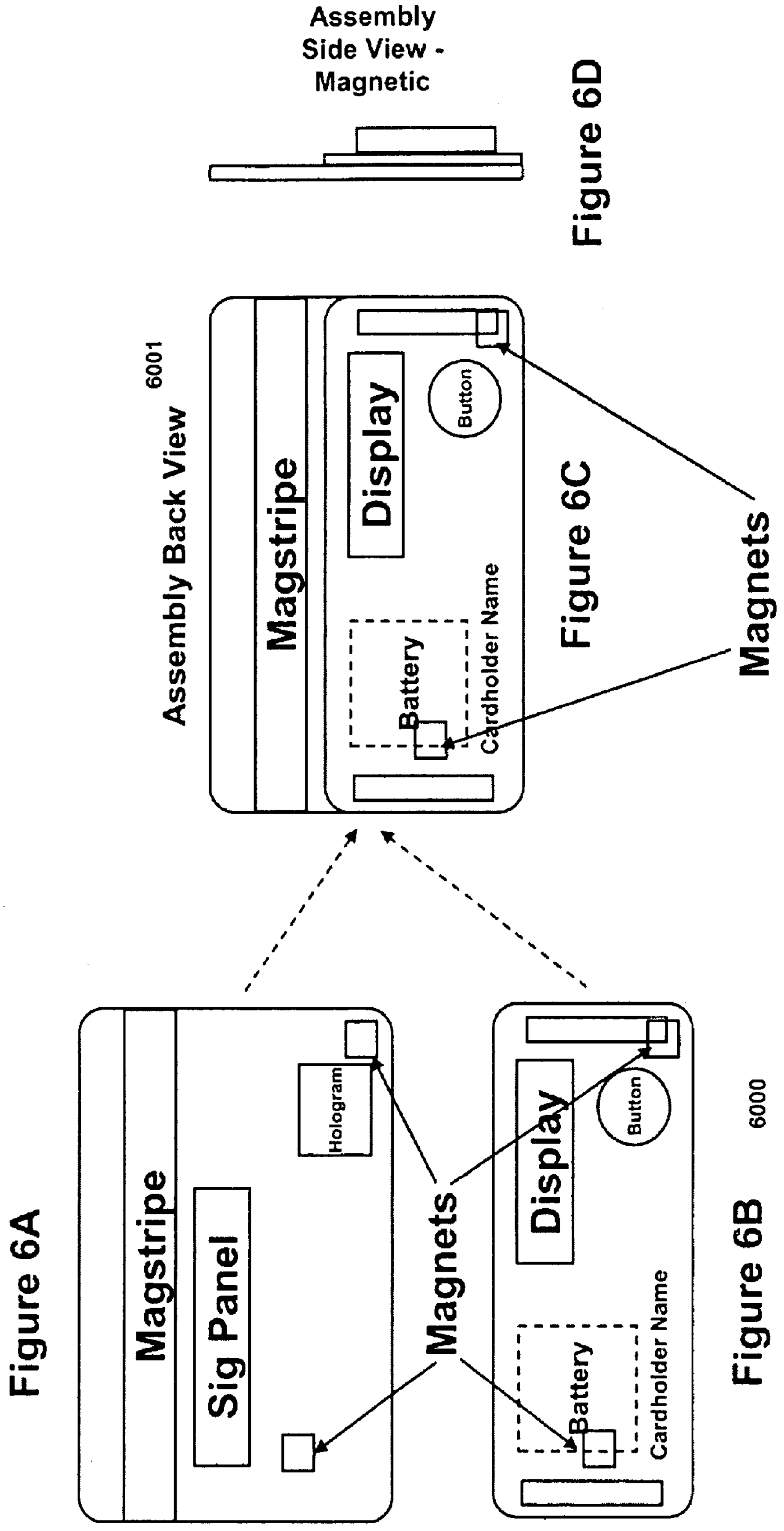
FIGS. 6A-6D illustrate an example of the multi-function removable card cover embodiment wherein the payment card and the card cover assembly are magnetically coupled. The card and cover may be coupled with or without the alignment of the pins and their corresponding pinpoles (pins/pinholes not shown).
Figures 7A, 7B, 7C, 7D:
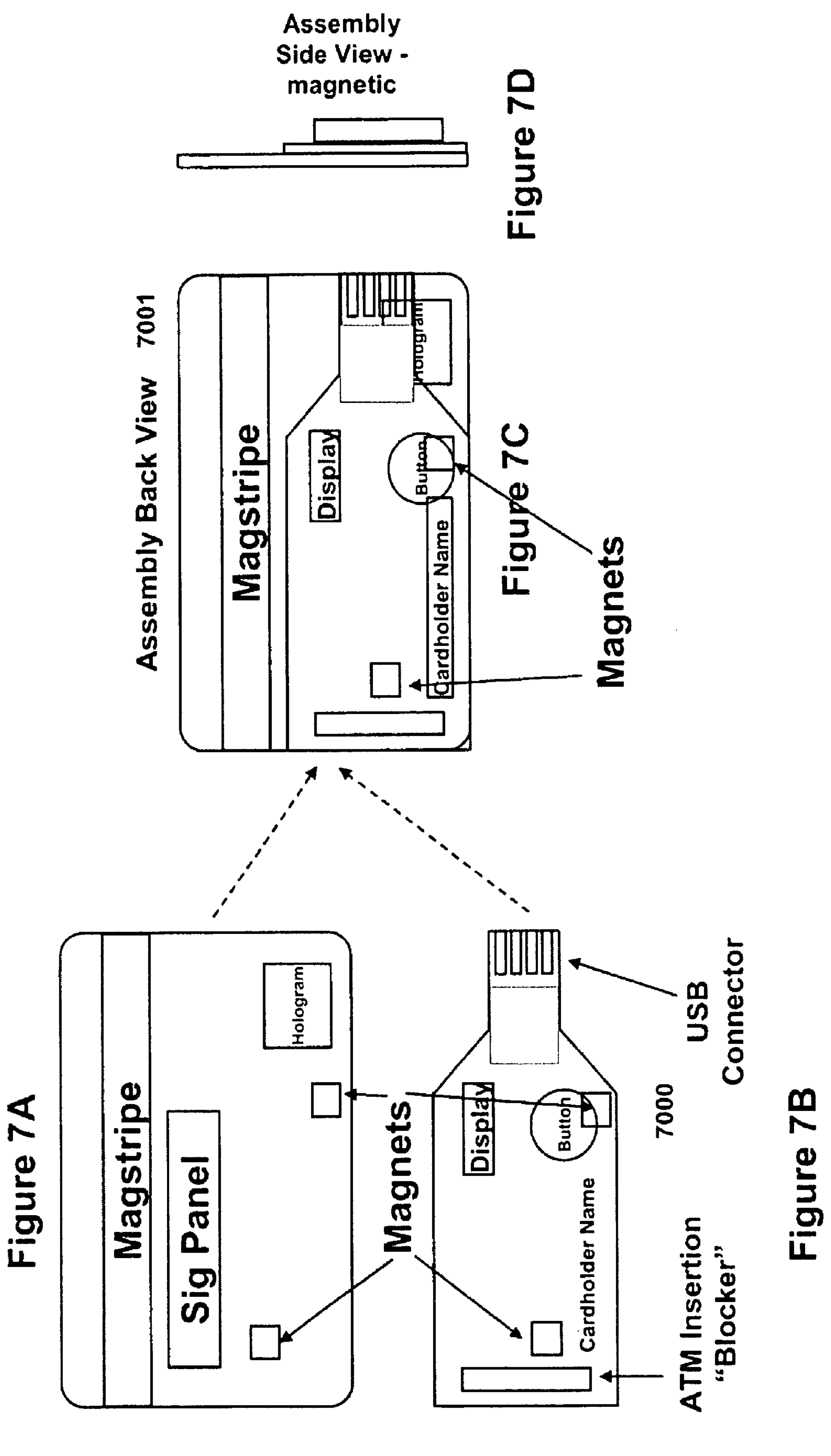
FIGS. 7A-7D illustrate another example of the multi-function removable card cover embodiment wherein the card cover further comprises an external interface (e.g. USB connector). The card and card cover may be magnetically coupled with or without alignments of the pins and the corresponding pinpoles (pins/pinholes partially shown).
Figures 8A, 8B, 8C, 8D:
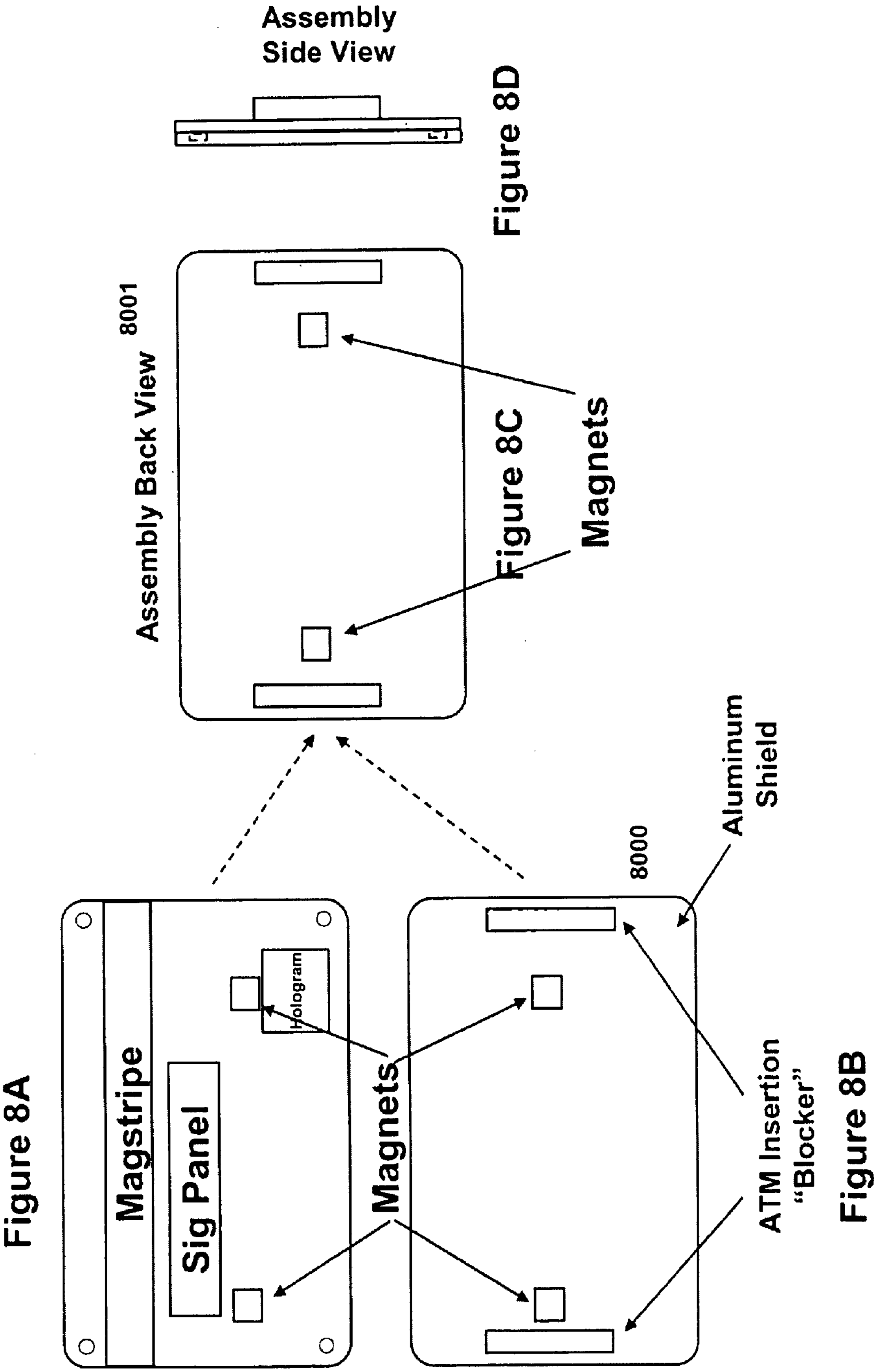
FIGS. 8A-8D illustrate another example of the multi-function removable card cover embodiment wherein the card cover may further comprise a conductive element and be configured as an RF shield. The cover may further comprise an insertion blocker for preventing unintended insertion into optical or magnetic (e.g. ATM) readers. The card and card cover may be magnetically coupled or the coupling may be facilitated by the alignments of the pins and the corresponding pin-poles (pins/pinholes partially shown).
Figure 9A:
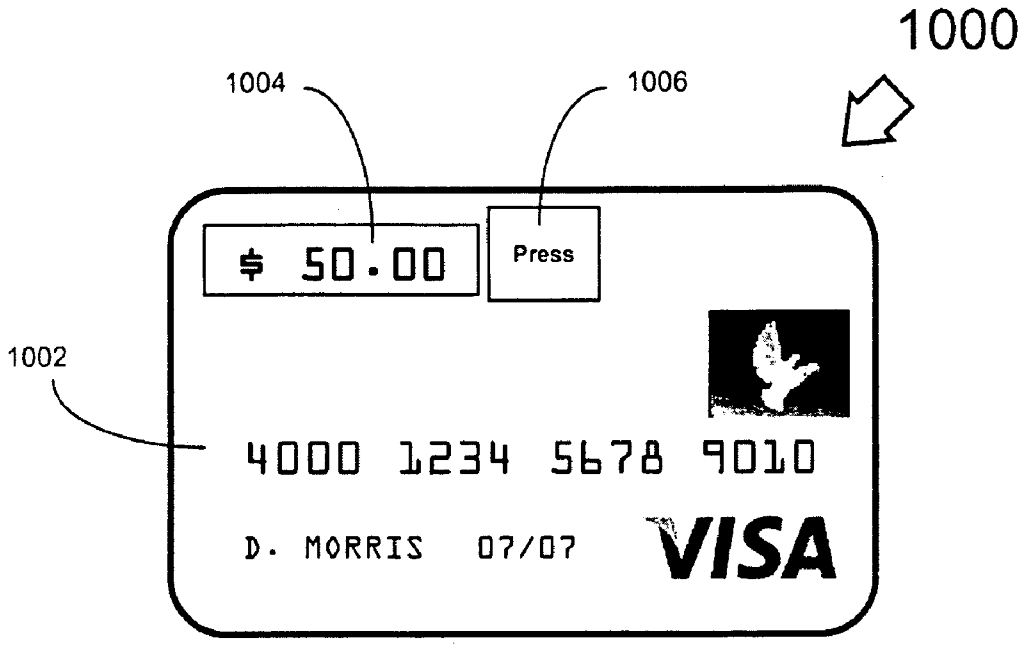
FIGS. 9A-9B illustrate an exposed view of a multifunction card cover according to one exemplary embodiment of the invention. Exemplary user input button is shown.
Figure 9B:
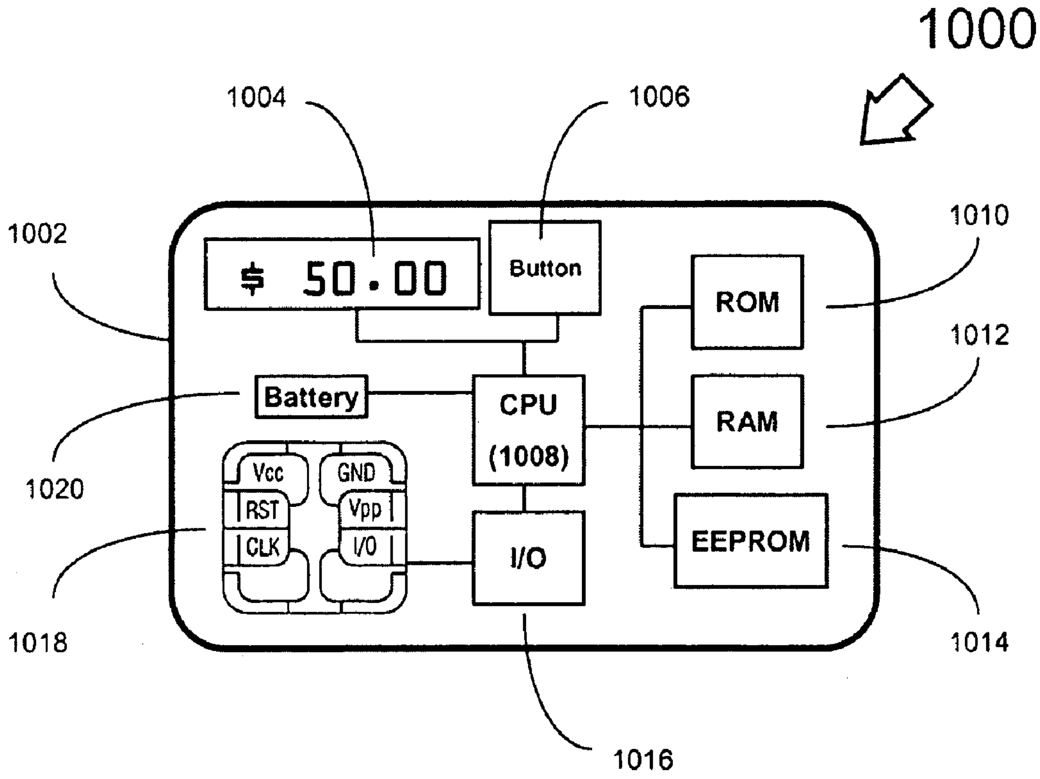
Figure 10A:
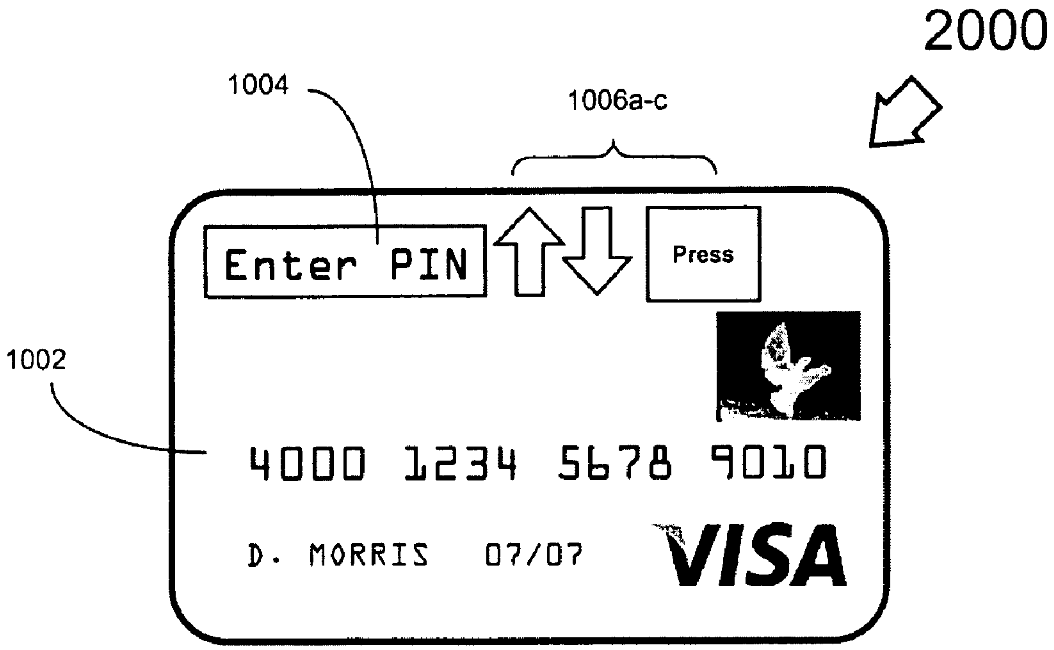
FIGS. 10A-10B illustrate an exposed view of a multifunction card cover according to one exemplary embodiment of the invention. Exemplary user input buttons are shown.
Figure 10B:
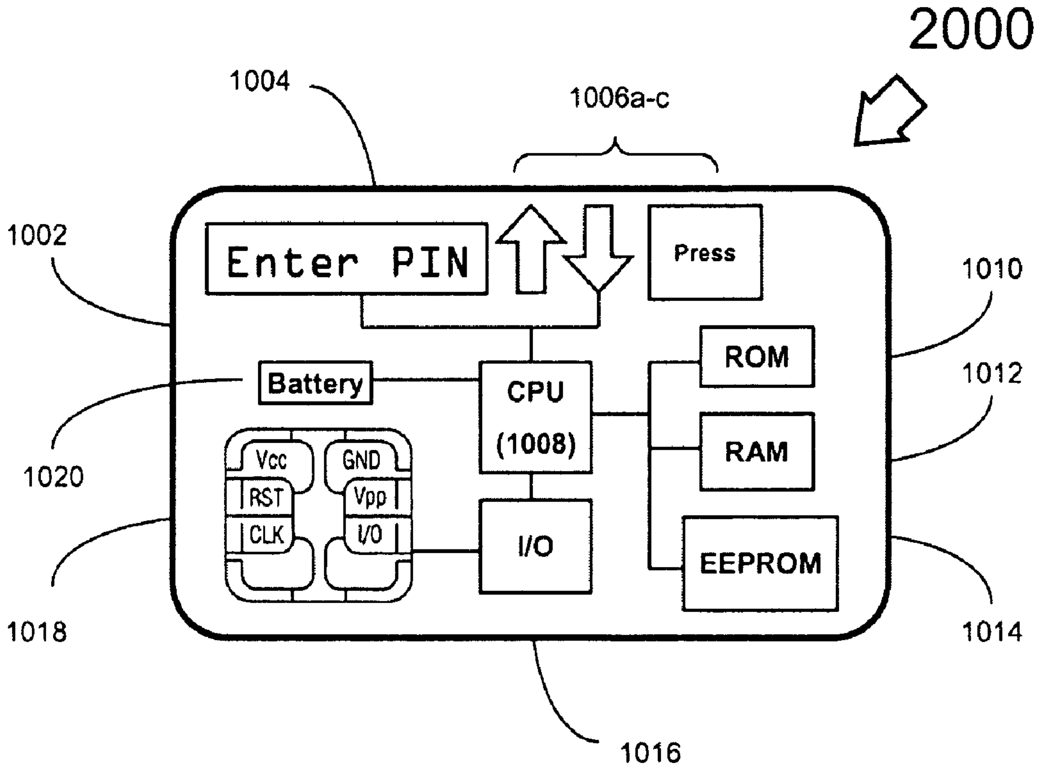

Accordingly, there is a need for multifunction removable covers configured to display unique user data associated with the portable payment devices. Additionally, there is a need for password tokens type portable payment device amenable to delivery/authentication of one-time password for conducting financial transactions that are substantially independent of internal power supply. Furthermore, there is a need for methods and devices for preventing unintended transmission by RF-enabled portable payment devices during transit.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Aspects of the present invention relate generally to devices for conducting financial transactions. Certain exemplary embodiments relate to multifunction removable cover for portable payment device comprising a solid support; and a card-communication contact, connected to the solid support, and configured to couple the multifunction removable cover to the portable payment device. The card-communication contact may include for example, contact-making element configured to connect the card to the card-cover. Other exemplary embodiments relate to multifunction removable covers for portable payment devices such as, for example, credit cards. The multifunction removable covers may include a display panel, an external interface, a power source, and user input device, or an imprinting feature. Additionally, the multifunction removable covers may be configured as a radio frequency (RF) blocking shield. The multifunction removable covers may also comprise access blockers for preventing unintended insertion into optical or magnetic card readers. Furthermore, exemplary embodiments of the multifunction removable covers for portable payment devices may additionally include magnetic features or external alignment features, such as, for example, peg and/or pins, and/or pinholes, useful in the coupling of, for example, credit card and their corresponding card cover. Furthermore, the multifunction cover may be configured to include a display, a power source, and a user input device to display instantaneous dynamic user associated data or to authenticate one-time passwords (OTPs).

In certain embodiments, multifunction removable covers further comprising a display panel and a user input device are provided.

In certain embodiments, multifunction removable covers further comprising a power source are provided.

In certain embodiments, multifunction removable covers further comprising an external interface are provided.

In certain embodiments, multifunction removable covers further comprising an insertion blocker are provided.

In certain embodiments, multifunction removable covers configured as radio frequency (RF) shields are provided. In certain further embodiments, the multifunction removable covers comprise conductive elements.

In certain embodiments, multifunction removable covers configured to display unique user data associated with the portable payment devices are provided. The portable payment device response to a query request via a user input device located on the multifunction removable cover, after accessing and/or authenticating user associated data encoded on the portable payment device, the multifunction removable cover then displays the current user associated data. The current user data may include dynamic real-time data or static data.

In other aspects, multifunction removable covers for portable payment devices configured as external interface password tokens capable of delivering and/or authenticating one-time passwords are provided.

In yet another aspect, multifunction removable covers for portable payment devices configured as radio frequency shields to prevent unintended data transmission are provided.

As used herein, portable payment devices that can be suitably coupled to the various multifunction removable cover embodiments of the present invention may include, for example, contact cards, credit cards, debit cards, stored value cards, pre-paid cards, and contactless cards. As used herein, a card may be broadly understood as being a portable payment device associated with an account within a payment system. The account may be a credit account, a debit account, a stored value account such as, for example, a pre-paid account, an account accessible with a gift card, an account accessible with a reloadable card. Suitable payment card embodiments may be made of plastic, including PVC and ABS plastic. The card may be embedded with imprinting features and/or a hologram to avoid counterfeiting. The card can be embossed with cardholder name, account number, and other identifying information, or it can be unembossed, with all identifying information printed on the face of the card.

In addition, as used herein, portable payment device may also include a payment token, password token, smart card, chip card, or integrated circuit card (ICC), or any pocket-sized card with embedded integrated circuits which can process information. Certain exemplary embodiments are capable of receiving input, which is processed, by way of the ICC applications, and delivered as an output. Suitable categories of ICCs include, but not limited to, memory cards containing non-volatile memory storage components, and perhaps some specific security logic and microprocessor cards containing volatile memory and microprocessor components.

As used herein, a contact less payment device may include a device that incorporates a means of communicating with a portable payment device reader or terminal without the need for direct contact. Such portable payment devices may effectively be presented in the proximity of a portable payment device reader or terminal. A smart chip may include a semiconductor device that is capable of performing most, if not all, of the functions of a smart card, but may be embedded in another device. Such contact less devices may communicate with the portable payment device reader or terminal using RF (radio-frequency) technology, wherein proximity to an antenna causes data transfer between the portable payment device and the reader or terminal.

Turning to FIGS. 1-11, these figures depict various multifunction removable covers for a portable payment device configured to couple portable payment device, constructed and operative in accordance with various embodiments of the present invention. As shown in the figures, the portable payment device 1000 includes a solid support 1002. Some embodiments of solid support 1002 also have a magnetic stripe containing encoded user associated data, such as, for example, personal account number and the expiration date. It is understood that solid support 1002 may further contain a stamped imprint of a primary account number a customer name, expiration date, and various security measures such as a hologram or signature panel. As shown in FIGS. 1-11, multifunction removable cover embodiments may also include a solid support 1002, a display 1004, a power source 1010, insertion blockers 1009, joining pins 1118, bored holes 1007, coupling magnets, or a user input device 1006. It is understood that solid support 1002 may further contain a stamped imprint of a primary account number a customer name, expiration date, and various security measures such as a hologram or signature panel.

Display 1004 may be a liquid crystal display (LCD), light-emitting-diode (LED), organic light-emitting-diode (OLED), surface-conduction electron-emitter display (SED), digital light processing (DLP), interferometric modulator display (IMOD) or any other display known in the art that can be used within the form factor required by the portable payment device 1000.

Exemplary user input device 1006 (e.g. button) may include any sensor keys or button known in the art. It is understood by those familiar in the art that one or more user input devices (including keys or buttons) may be implemented.

Internal components of the multifunction removable cover are shown in FIG. 1D. Embedded within plastic support 1002, a processor or central processing unit 1008 is electrically coupled to the display 1004, user input device (e.g. button) 1006, Read-Only-Memory (ROM) 1010, Random Access Memory (RAM) 1012, a non-volatile programmable memory 1014, input/output circuitry 1016, and power supply (1020). It is understood by those familiar with the art that some or all of these elements may be embedded together in some combination as an integrated circuit (IC). Embodiments may also contain a conductive contact-making element 1018.

Processor 1008 may be any central processing unit, microprocessor, micro-controller, computational device or circuit known in the art.

Read only memory 1010 is embedded with an operating system.

Non-volatile programmable memory 1014 is configured to be an application memory device, and may store information such as the primary account number and/or current balance information. Examples of non-volatile programmable memory 1014 include, but not limited to: a magnetic stripe, flash memory, Electrically Erasable Programmable Read-Only Memory (EEPROM), or any other non-volatile computer memory or storage known in the art.

Random access memory 1012 is any temporary memory storage medium element known in the art. Random access memory is usually (but does not have to be) volatile memory.

The processor 1008, the read only memory 1010, the random access memory 1012 and the non-volatile programmable memory 1014 may coupled to one another through an internal bus system. Data can be interchanged between the input/output unit 1016, the processor 1008 and the non-volatile programmable memory 1014. Furthermore, data can be interchanged between the processor 1008 and the non-volatile programmable memory 1014.

Additionally, in some embodiments, the input/output circuitry 1016 is further coupled to a conductive contact-making element 1018 being formed in a surface area of the solid support 1002. In some embodiments, the conductive contact-making element 1018 may be replaced by a radio frequency (RF) transceiver 1018. Radio frequency embodiments may typically use any RF transceiver known in the art for use in a radio frequency identifier (RFID) application or commonly used in a “pay wave” or “contactless” payment card.

In yet other embodiments, a contactless RF transceiver may be embedded in plastic support 102 in addition to the conductive contact-making element 1018.

The electrically conductive contact-making element 1018 contains area elements that are electrically decoupled from one another, and these are annotated VCC, GND, RST, VPP, CLK and I/O. VCC is the connection for a supply voltage, RST is the connection for a reset signal, CLK is the connection for a clock signal, GND is the ground connection, VPP is the connection for a programming voltage, and I/O forms a connection as a data input/data output. The connection RST is used for application of a start signal for communication. A clock for the smart card processor is supplied from the outside via the connection CLK, with the clock frequency according to the described exemplary embodiment being 7.5 MHz. The programming voltage which is applied to the connection VPP is usually a voltage higher than the supply voltage. Bi-directional data transmission takes place via the input/output connection I/O for the actual interchange of useful information with the smart card. Similar data exchange or transmission takes place in contactless embodiments.

Power supply 1020 may be any electrical power supply, including a battery, fuel cell, photovoltaic, long-term capacitor or any other power storage known in the art. Power supply 1020 may be recharged by applying a direct current voltage. A voltage is applied to the payment card 1000 as the supply voltage VCC. Exemplary supply voltages may include 5 volts, 3.3 volts, or 1.7 volts.

As shown in FIGS. 1A-1D and FIGS. 2A-2D, constructed and operative in accordance with an embodiment of the present invention, multifunction removable cover embodiments are illustrated in the "separate" (FIGS. 1A-1D) and "coupled" (FIG. 2C) configurations. In certain embodiments, the multifunction removable cover embodiment may include display and user input devices configured to display static or dynamic user associated data. In certain embodiments, multifunction removable cover embodiment may include a power source (e.g. battery) and be configured to provide power as password token payment device assembly when coupled with portable payment device. In certain other embodiments, multifunction removable cover may also include magnetic coupling devices to maintain spatial configuration of the card-cover assembly or insertion blocking devices to prevent unintended insertion into optical or magnetic reader by the coupled card-card cover assembly during financial transactions.

As shown in FIGS. 3A-3D, FIGS. 5A-5D, and FIGS. 7A-7D, constructed and operative in accordance with an embodiment of the present invention, multifunction removable card cover embodiments may further comprise an external interface 3000. It is understood by those of skill in the art that any number of external interface may be implemented on the multifunction removable cover, and that the choice of USB interface is for illustrative purposes only. It is also understood that exemplary external interface may also include Institute of Electrical and Electronics Engineers (IEEE) 1394 (Firewire) interface, as well as serial port or parallel port interface. In certain embodiments, external interface may be a conduit for additional power source when connected to a network. Additionally, in certain embodiments, the external interface, while connected to the network, may also be a conduit for delivery and authentication of one-time password or encoding of dynamic data via contact-making element which is in communication with the contact-making element on the corresponding portable payment device. Methods of delivery, authentication, and encoding may include those that are understood by those of skill in the art. In FIGS. 3A-3D, an exemplar of the external interface enable multifunction cover embodiment is shown in "separate" (FIGS. 3A, 3B) and "coupled" (FIG. 3C) configurations. The magnetic stripe of the payment device is exposed in the exemplary coupled configuration to allow for traditional "contact" transaction. Following initiation of financial transaction by "contact" query (e.g. magstripe swipe), the external-interface-enabled payment cover and payment device assembly may be connected to the network via the external interface for additional authentication and/or delivery of one-time password interrogation. In FIGS. 5A-5D, the external interface enable multifunction cover embodiment is shown with the display and user input elements. The display element may display dynamic or static user associated data and is responsive to user input devices and information transmitted thereby. In FIGS. 7A-7D, the external interface enable multifunction cover embodiments may further comprise magnetic coupling elements useful for maintaining the spatial configuration of the payment device-cover assembly.

As shown in FIGS. 4A-4D and FIGS. 8A-8D, constructed and operative in accordance with an embodiment of the present invention, a multifunction removable card cover may include conductive elements (e.g. aluminum) and be configured as a radio frequency shield to prevent unintended RF transmission. In certain embodiments, the RF shield type multifunction cover may also include magnetic coupling elements or blockers for preventing unintended insertion into magnetic or optical readers (e.g. ATMs) during financial transactions.

As shown in FIGS. 9A-D, constructed and operative in accordance with an embodiment of the present invention, a multifunction removable card cover may have multiple buttons 1006*a-c*. It is understood by those known in the art that any number of buttons 1006 may be implemented on a portable payment device, and that the choice of three buttons 1006 is for illustrative purposes only. Arrow buttons 1006*a-b* may be used for entering alpha-numeric information such as a personal identification number or alpha-numeric code. Some embodiments may implement buttons 1006 as part of a numeric pad or alpha-numeric keyboard.

As used herein, portable payment devices and multifunction removable covers thereof provide an integrated apparatus for conducting electronic commerce and/or financial transactions. The transactions may include, for example, retail purchases, transit fares, access to venue fares, or online transactions.

In certain embodiments, portable payment devices are used in an electronic transaction (e.g., a point of service that is connected to a payment processing system during a transaction). The information from the payment device may be transmitted to an issuer during a retail payment transaction for purposes of authorizing the use of the payment device for that transaction. The issuer may review parameters of the transaction such as transaction amount, credit history, card authenticity, and other factors when determining whether or not to authorize or decline the transaction.

In general, an issuer validation (e.g., authorization) request message is created during an electronic transaction for goods and/or services at a Point Of Sale (POS) using a portable payment device. The issuer validation request message can be sent from the POS terminal located at a merchant to the merchant's acquirer, to a payment processing system, and then to an issuer. An "issuer validation request message" can include a request for issuer validation to conduct an electronic payment transaction. It may include one or more of an account holder's payment account number, currency code, sale amount, merchant transaction stamp, acceptor city, acceptor state/country, etc. An issuer validation request message may be protected using a secure encryption method to prevent data from being compromised.

As used herein, an electronic payment transaction may be authenticated if the consumer conducting the transaction is properly authorized and has sufficient funds or credit to conduct the transaction. Conversely, if there are insufficient funds or credit in the consumer's account, or if the consumer's portable payment device is reported as lost or stolen, then an electronic payment transaction may not be authorized.

As used herein, portable payment device according to some embodiments of the present invention may include payment device having vertical and horizontal dimensions of a standard credit card, e.g. about 2⅛ inches by about 3⅜ inches and a multifunction removable cover which extends over substantially the portable payment device. In some embodiments, the payment device-cover assembly may be thicker than a standard plastic credit card. In certain embodiments, a display panel (1004) extends over substantially the face of the multifunction removable cover.

In some aspects, a processor is provided in the cover device that is configured to display unique user associated data on the display panel and, in some embodiments, to control the magnetic encoder on the portable payment device to provide magnetic stripe information for the predetermined credit card, in response to user selection of the predetermined credit card via the user input device (1006 A-C).

In certain embodiments, multifunction removable cover for portable payment devices may include imprinting features, which may include, for example, user name; account number, including for example, 16 digit number in groups of four that is unique to the account holder.

In certain embodiments, the multifunction removable cover for portable payment devices may include a power source, including, for example, a battery 1020, fuel cell and/or photocell. In certain other embodiments, there is provided a multifunction removable cover for portable payment devices comprising an electrical contact, such an electrical contact may include, for example, those used in conventional "smart cards" or a Universal Serial Bus (USB) connector (3000).

In certain other embodiments, the multifunction removable cover for portable payment devices may include one or more user input devices, such as one or more soft keys that are incorporated into the flat panel display, a keypad, a keyboard, and/or other user input device.

In certain other embodiments, the multifunction removable cover for portable payment devices may include components and/or material for shielding undesired transmissions from the portable payment device, including, for example, transmissions mediated by a short range wireless transmitter/receiver, such as, for example, a Bluetooth, Wi-Fi and/or other short range radio transceiver; a Radio Frequency ID (RFID) receiver; an RFID transmitter; a cellular transceiver, including, for example, conventional cellular, Personal Communication System (PCS), wideband cellular, and/or other conventional cellular device; a bar code reader; a location system, such as a global positioning system (GPS) system.

In certain other embodiments, the multifunction removable cover for portable payment devices may include components and/or material, for example, one or more magnets, pins, pegs, extensions, pinholes, bored holes, for magnetically and/or non-magnetically aligning and/or coupling the multifunction removable cover to the portable payment devices. In certain aspects, the non-magnetic connection includes symmetrical alignment and/or fitment of the exemplary pins and/or pegs into similarly sized holes bored into the back of a portable payment device. It is understood by those familiar in the art that one or more magnets may be implemented.

Figure 11B:
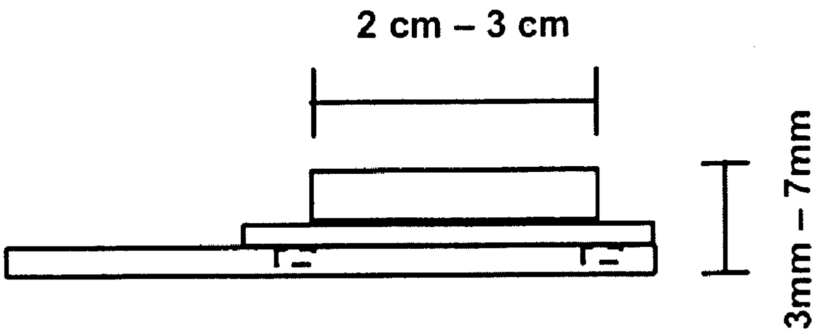
FIG. 11—illustrates a diagram for an exemplary insertion blocker (e.g. ATM blocker).
Figure 11A:
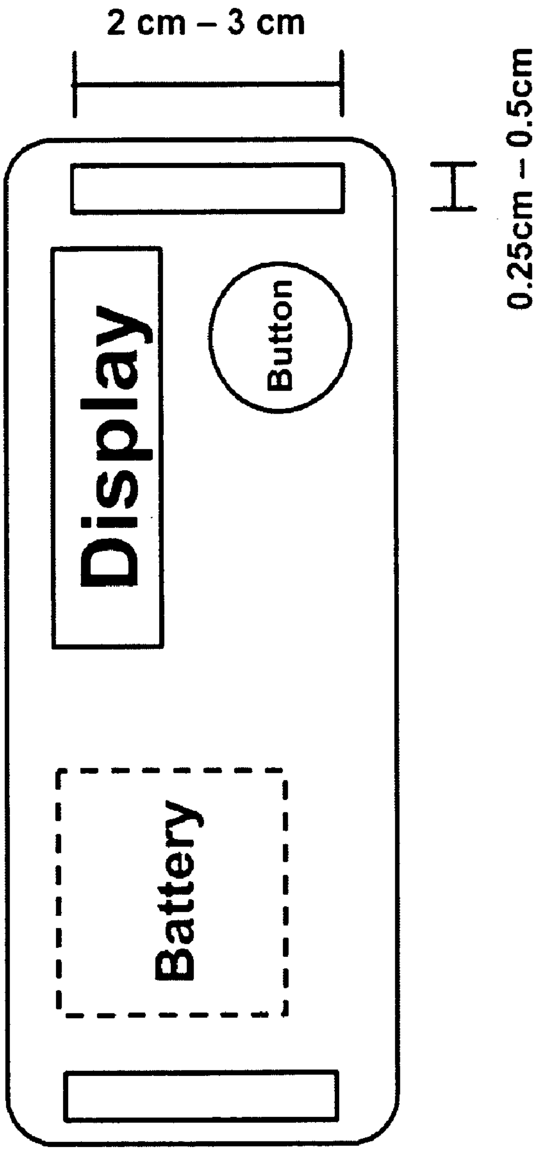

In certain other embodiments, the multifunction removable cover for portable payment devices may include components and/or material for the prevention and/or blocking (blockers) undesired insertion of the multifunction removable cover—portable payment device assembly into magnetic/data reader, such as ATMs. Exemplary component/material for these blockers may include, for example, ABS, PVC plastic or any other compatible material to match the material of the payment device body. The blockers may also be placed and/or attached to the body of the payment device such that the height (e.g. thickness) of the blocker-payment device assembly effectively blocks insertion of the card into the transit unit of the ATM. In certain embodiments, the full height of the assembly (including the payment card, the multifunction card attachment, and the "ATM blocker" may be between, for example, about 3 mm and about 7 mm (FIGS. 11A-11B). In certain embodiments, the width of the blocker may be between about 0.25 cm and about 0.5 cm (FIGS. 11A-11B). In certain embodiments, the length of the blocker may be between about 2 cm and about 3 cm (FIGS. 11A-11B). In certain other embodiments, the dimensions of the blocker will vary within these tolerances depending on the specific application (display, RF shield, or USB configurations) in accordance with different sizes of the multifunction removable cover.

In certain other embodiments, the multifunction removable cover for portable payment devices may function in "Display Only and/or USB Connector mode." In an exemplary configuration, the multifunction removable card cover is coupled magnetically and/or non-magnetically to the payment card. It is understood by one of skill in the art that modification of the payment device (e.g. payment card) may be performed within acceptable manufacturing parameters to accommodate the card-cover attachment mechanism. The card-cover and payment device assembly for use in the Display Only or the USB interface configuration may be further modified to be compatible with network infrastructure to manage the delivery and authentication of one-time passwords. As used herein, one-time password may include a password that changes after each login, or changes after a set time interval. Exemplary one time password may include mathematical-algorithm-based one-time passwords or time-synchronized one-time passwords.

In certain other embodiments, the multifunction removable cover for portable payment devices may function in the "display" only mode. The display card attaches to a standard payment card by magnetically or by positioning of the pegs (one or more) that are coupled to similarly sized holes bored into the back of a the payment card. The attachment substantially covers of the card while leaving the magnetic portion still exposed, so that the magnetic stripe may still be used for standard face-to-face transactions. In order to prevent accidental insertion into ATMs or other transport insertion mechanisms, the device may include one or more thicker elements to block unintentional card insertion. User associated data, including, for example, static and dynamic data, is displayed on the display panel in response to user input query or electronic communication/interrogation via contact making-elements on the payment device and the corresponding card cover when they are coupled.

In certain other embodiments, the multifunction removable cover for portable payment devices may include an external interface. Exemplary external interface may include, for example, a Universal Serial Bus (USB) or an Institute of Electrical and Electronics Engineers (IEEE) 1394 (Firewire) interface which may attach to a standard payment card. During user transaction, the user may insert the external interface into a computer in order to deliver one-time passwords for authentication. In certain embodiments, the external interface may facilitate programming dynamic card verification value (CVV) values in a chip on the card and delivered to a computer via the external interface. In certain embodiments, the multifunction removable covers with external interface attachments may or may not include the ATM insertion blockers.

In certain other embodiments, the multifunction removable cover for portable payment devices may function as a radio frequency (RF) shield to prevent undesired RF transmission once the payment card and the multifunction removable card-cover is accordingly positioned as a card-cover payment device assembly. Exemplary card-cover material, either as a constituent or as a surface coating, suitable for RF shielding may include, for example, aluminum, copper, titanium, or any other conductive element. An aluminum plate (or any other material deemed suitable to block the RF signal) may be so attached to a standard paywave (contactless-enabled) card by means described above. In certain desired configuration, the RF signal will only emanates out of the back of the card and thus blocks the undesired transmission of the private data. During mail delivery of the card to account holders, the multifunction removable card cover may be affixed to the payment card before it is mailed to the recipient to safeguard account the information. In certain embodiments, the cardholder may also choose to attach the cover when he/she does not want to transmit the data due to security concerns. The attachment may or may not have the ATM insertion blockers, as described above.

In certain embodiments, there is provided a system for conducting e-commerce and or financial transactions wherein the system comprises a multifunction removable cover for portable payment device and a terminal, which may include a card reader, which may be for example, any magnetic or optical card reader known in the art which is capable of reading information encoded in the magnetic stripe. The terminal may be similar in appearance to present day terminals, and may have a slot into which the various embodiments of the present invention will be inserted and slid past a card reader as in any present day card reading system.

The card reader will transmit this information to a network which identifies the user. The network looks up or determines the information known only to the user, and displays a message on the screen indicating that the cardholder should now type in the needed information for the transaction to continue. A magnetic stripe is typically found on the back face the portable payment device and contains in magnetic form at least the information displayed on the front surface. To process a transaction using the payment device and or the payment device/cover assembly, a seller may use a magnetic stripe reader, and by sliding at least the upper portion of the device and/or the assembly through a slot to read the information stored on the magnetic stripe, may obtain an authorization for a transaction by means well known in the art.

The design and operation of the individual devices/features described herein are well known to those having skill in the art, including those presently known or later developed. It will be understood by those having skill in the art that embodiments described herein may be combined in various combinations and sub-combinations.

Various types of content may be stored in an electronic card according to various embodiments of the present invention. The content can include credit cards, store cards, including frequent shopper cards that can include tallies of total savings, points and purchases, advertisements and/or coupons that can be linked to a loyalty program, receipts, personal information management data, maps and/or Web pages, other applications, such as bank balance, health check, calorie counter, medical records and information, health information and/or military history. Graphical user interfaces can include a display, a touch screen, a voice recognition system, a speaker, and a video player. Interfaces may be provided using a programmable magnetic stripe, RFID, bar code reader and display capability, radio (cellular, Wi-Fi, Bluetooth, ultra wideband, television) and/or electrical contacts.

Various security applications may be provided including encryption of data on the card, pin codes, auto locking timeouts, and/or remote locking and deleting. Other capabilities may be provided on the card, including location capabilities and the ability to provide multiple profiles, such as an individual profile or a group profile, so that the card may be used as an individual and as an employee, for example. General purpose personal computer functionality also may be provided, as well as a browser, synchronization capabilities with a personal computer or personal digital assistant, and voice, data, image and/or video capabilities.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A multifunction removable cover for a portable payment device comprising:

a solid support;

a card-communication contact, connected to the solid support, and configured to couple the multifunction removable cover to the portable payment device; and a radio frequency blocking shield configured to prevent undesired radio frequency transmission when coupled to the portable payment device.

2. The multifunction removable cover according to claim 1 further comprising a display panel configured to display unique user associated data.

3. The multifunction removable cover of claim 2, wherein the display panel is configured to be responsive to the user input device.

4. The multifunction removable cover according to claim 1 further comprising an external interface configured to be compatible with network infrastructure during delivery and authentication of one-time passwords.

5. The multifunction removable cover of claim 4, wherein the external interface is a Universal Serial Bus (USB) interface, IEEE Firewire interface, serial port interface, or parallel port interface.

6. The multifunction removable cover according to claim 1 further comprising a power source configured to supply sufficient power to the removable cover.

7. The multifunction removable cover of claim 6, wherein the power source comprises a battery.

8. The multifunction removable cover according to claim 1 further comprising a user input device.

9. The multifunction removable cover of claim 8, wherein the user input device comprises a button or key.

10. The multifunction removable cover according to claim 1 further comprising an imprinting feature.

11. The multifunction removable cover of claim 1, wherein the radio frequency blocking shield comprises a conductive element.

12. A multifunction removable cover for a portable payment device comprising;

a solid support;

a card-communication contact, connected to the solid support, and configured to couple the multifunction removable cover to the portable payment device; and an insertion blocker configured to prevent undesired insertion into an optical or a magnetic card reader.

13. The multifunction removable cover of claim 12, wherein the insertion blocker is configured to prevent undesired insertion into the optical or the magnetic card reader when the portable payment device is coupled to the multifunction removable cover.

14. A multifunction removable cover for a portable payment device comprising:

a solid support;

a card-communication contact, connected to the solid support, and configured to couple the multifunction removable cover to the portable payment device; and an imprinting feature comprising a cardholder name, an expiration date, a card company brand, or a unique user account number.

15. The multifunction removable cover according to claim 14 further comprising an external interface configured to be compatible with a network infrastructure during delivery and authentication of one-time passwords.

16. The multifunction removable cover according to claim 14 further comprising a power source configured to supply sufficient power to the removable cover.

17. The multifunction removable cover according to claim 14 further comprising a user input device.

18. A multifunction removable cover for portable payment device comprising:

a display panel configured to display unique user associated data;

an external interface configured to be compatible with network infrastructure during delivery and authentication of one-time passwords;

a power source configured to supply sufficient power to the removable cover;

an user input device; and a radio frequency blocking shield configured to prevent undesired radio frequency transmission when coupled to the portable payment device.

19. A multifunction removable cover for portable payment device comprising:

a display panel configured to display unique user associated data;

an external interface configured to be compatible with network infrastructure during delivery and authentication of one-time passwords;

a power source configured to supply sufficient power to the removable cover;

a user input device;

a radio frequency blocking shield configured to prevent undesired radio frequency transmission when coupled to the portable payment device; and an insertion blocker configured to prevent undesired insertion into optical or magnetic card reader.

* * * * *